United States Patent [19]

Magnuson

[11] 4,132,162
[45] Jan. 2, 1979

[54] APPARATUS FOR PEELING FRUITS AND VEGETABLES

[75] Inventor: Robert M. Magnuson, Saratoga, Calif.

[73] Assignee: Magnuson Engineers, Inc., San Jose, Calif.

[21] Appl. No.: 862,103

[22] Filed: Dec. 19, 1977

[51] Int. Cl.² .................. A23N 7/00; A47J 17/00
[52] U.S. Cl. ............................................. 99/630
[58] Field of Search .............. 99/516, 536, 585, 587, 99/621, 628–630, 640

[56] References Cited

U.S. PATENT DOCUMENTS 3,134,413  5/1964  Dorsa ................................ 99/629
4,023,477  5/1977  Hirahara ........................... 99/585

Primary Examiner—Leonard D. Christian
Attorney, Agent, or Firm—Gerald L. Moore

[57] ABSTRACT

An apparatus for removal of the epidermis from fruits and vegetables by an abrasive process. The apparatus includes a drum having rotating abrasive coated rolls positioned about the periphery. Rotation of the drum and rollers causes the product passing through to contact the abrasive-surfaced rolls for removal of the peel. To preserve the removed peel material and to conserve water, the peeling process is done in a dry environment during the initial stages with water only being introduced at the exit end of the apparatus to wash from the product any remaining peel particles.

2 Claims, 4 Drawing Figures

FIG. I.

APPARATUS FOR PEELING FRUITS AND VEGETABLES

BACKGROUND OF THE INVENTION

The removal of the epidermis of various fruits and vegetables by abrasion is generally well-known. Improvements in such apparatus have usually been accomplished to improve the production rate by increasing the amount of product passing through. It is obviously necessary that the primary requirement for effective operation of the apparatus is that the entire surface of the individual product come into contact with the abrasive surface for an appropriate period of time to assure complete and satisfactory peeling.

One apparatus suitable for efficiently removing epidermis is described in U.S. Pat. No. 3,134,413, issued on May 26, 1964, and entitled: Apparatus For Peeling Fruits Or Vegetables. In this apparatus the product is passed through a rotary drum having the periphery formed by a plurality of individually rotating abrasive-coated rolls. Thus the drum is rotated and the individual rolls are driven so as to abrade the surface of the product as it tumbles through the drum. In addition a center-positioned helicoid is rotated to impart a rotative force on the product opposite from that of the rotary drum so as to bring the product into contact with the drum periphery more often.

In this apparatus, water is introduced along the entire length of the interior of the drum to carry away the peel particles which are separated from the product body. This water mixes with the abraded peel material and is carried downward between the outer rolls to exit the apparatus through a bottom collection structure. It is common to introduce 30 gallons or more of water per minute into such apparatus which, with the abraded peel material, must be disposed of. Such disposal has presented a considerable problem in that present regulations in many communities prevent the introduction of such material into sewer lines or the sewer taxes are uneconomical and a private waste treatment plant is tremendously expensive. In addition, with water becoming more scarce in many localities the amount of water used has become important in the operation of the overall process.

Thus not only the quantity of water used but the disposal of the waste material has become an important consideration in the operation of such peeling apparatus. In addition, the abraded peel material from many products is now being used as an important ingredient of cattle food and the like thereby changing the character of the peel material from a waste material to one that can be sold or used separate from the product. However with the mixture of the abraded peel material with water, spoilage is accelerated and the handling of the material is greatly complicated. In some instances, it may cost more to dry the material for subsequent usage than the actual worth of the material.

It is the purpose of the present invention to provide an apparatus which peels products with a minimum usage of water while enabling the reclaiming of the abraded peel material in a dry state more suitable for other uses.

SUMMARY OF THE INVENTION

An apparatus for continuously peeling fruits and vegetables comprising a substantially horizontal rotary drum forming an interior compartment for receiving the product. The wall of the drum is formed by a plurality of circumferentially-spaced parallel-positioned rolls each being individually rotatable about its own axis and having an abrasive surface which removes the peel on contact with the product. A rotatable helicoidal conveyor is mounted concentrically within the drum and rotated for advancing the product and bringing it into repeated contact with the rolls at the drum periphery.

The drum interior is divided into a first compartment for receiving the product initially and a second compartment near the exit end of the drum. Water is introduced into the drum only in the second compartment for cleansing the product as it is discharged from the apparatus. The first compartment is maintained dry and the abraded peel material is carried away from the product and the compartment by the rotation of the drum and the rolls. A separate collection apparatus is positioned beneath each of the compartments for maintaining the dry material separate from the wet abraded peel.

DESCRIPTION OF THE INVENTION

Figure 1:
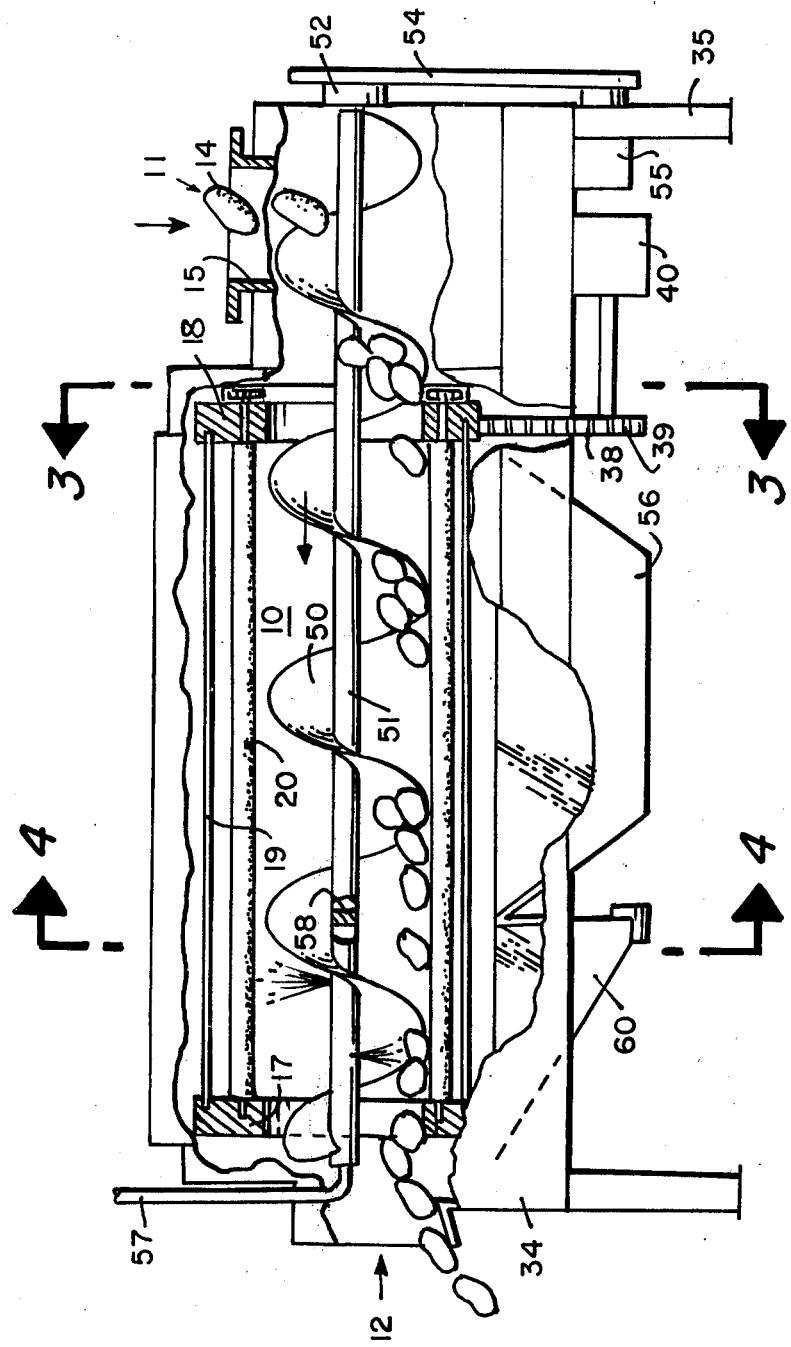
FIG. 1 is a side view of a peeling apparatus embodying the present invention with portions of its exterior broken away to illustrate certain interior structural details.

The peeling apparatus embodying the present invention is generally shown in the drawings and includes a rotary drum 10 having an abrasive interior surface that preferably is mounted for rotation about a substantially horizontal axis. Means are provided for advancing the fruits or vegetables to be peeled from the entrance end 11 to the exit end 12. Thus as shown in FIG. 1, the product 14 is introduced into the apparatus through the port 15 and is exited from the chute 16 after proceeding from right to left in the drawing of FIG. 1 during the peeling process.

The rotary drum 10 includes a pair of end rings 17 and 18 that are joined in spaced parallel relationship by a series of tie rods 19. These rings are provided with aligned bores which rotatably receive the respective ends of a plurality of shafts or rolls 20, each having an abrasive material fixed to its exterior surface. These rolls are rather closely spaced circumferentially around the rings 17 and 18 so that the interior abrasive surface of the drum 10 is interrupted only by small apertures or openings 22 (FIG. 2) between adjacent rolls. It is through these openings that the abraded peel of the fruits or vegetables passes after separation from the product body. However the rolls are positioned sufficiently close together to prevent the passage of the smallest fruit or vegetable being peeled.

The character of the abrasive surface on the rolls can vary dependent upon the particular fruit or vegetable being peeled in the apparatus. In many instances this surface is formed by the application of a granular outer coating to the roll. In addition certain rolls or portions thereof may be provided with short bristles (not shown) to facilitate the cleansing of depressions in the product surface. Thus the choice of the roll surface is dependent upon the type of product being peeled.

Figure 2:
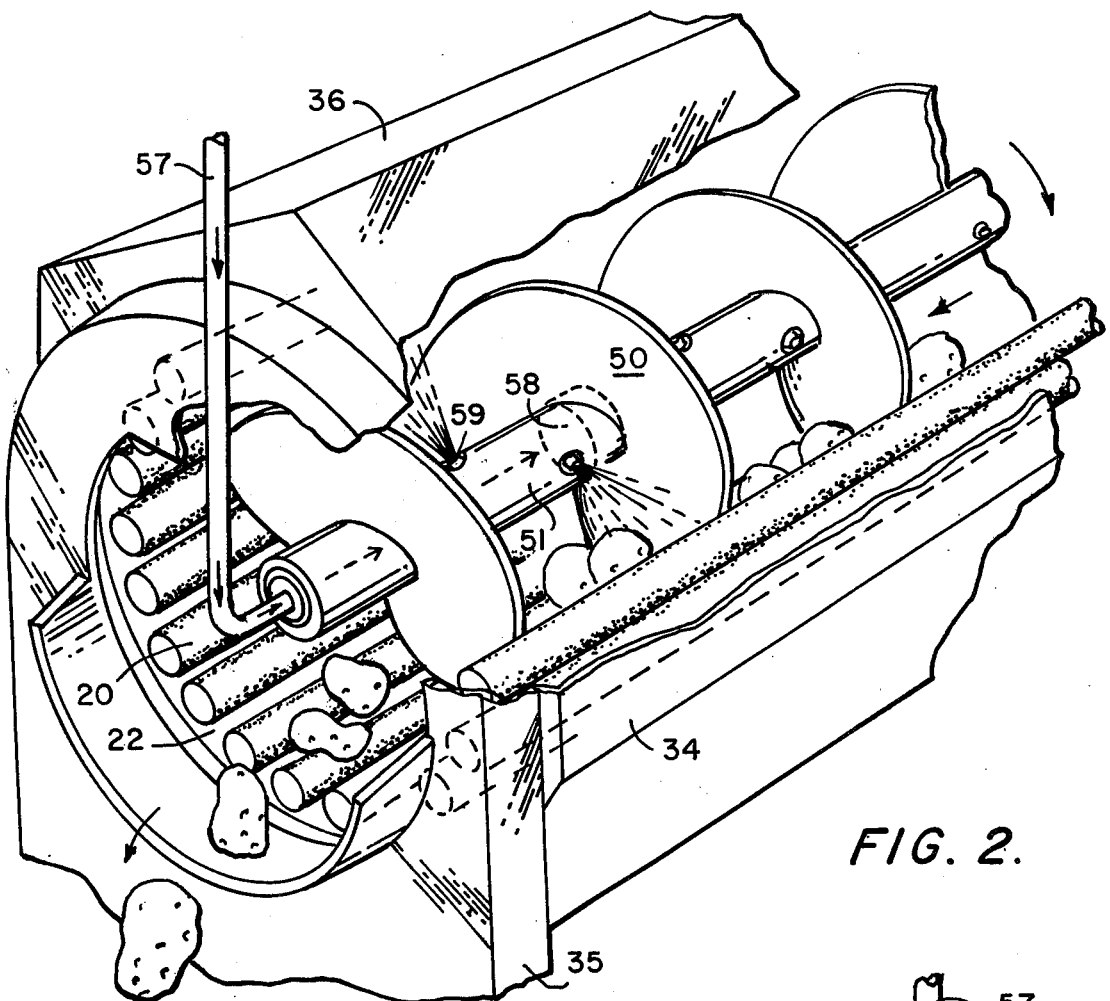
FIG. 2 is an enlarged isometric view of the exit end of the peeling apparatus of FIG. 1 with portions of the interior broken away to illustrate interior details.

The entire drum 10 is supported for rotation on pairs of support rolls 26 with one pair positioned at each end of the drum. These support rolls in turn are rotatably mounted on brackets 27 secured to a generally rectangular frame 34 supported at the corners by legs 35. From the side members of the frame 34, a cover 36 of a generally inverted U-shape is removably secured as shown in FIG. 2. Thus the entire rotary drum 10 is enclosed between the support 34 and the cover 36.

Figure 3:
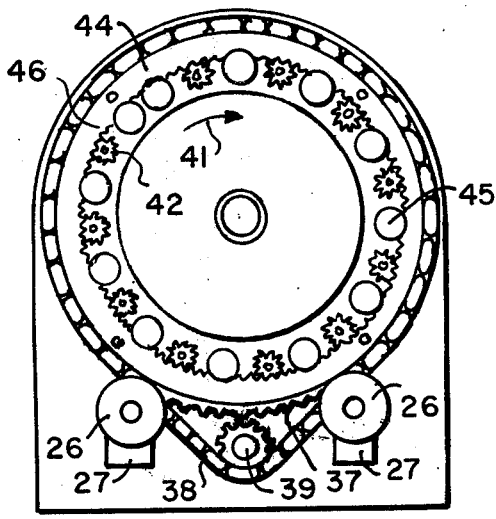
FIG. 3 is a cross-sectional view of the apparatus of FIG. 1 along the line 3—3.
Figure 4:
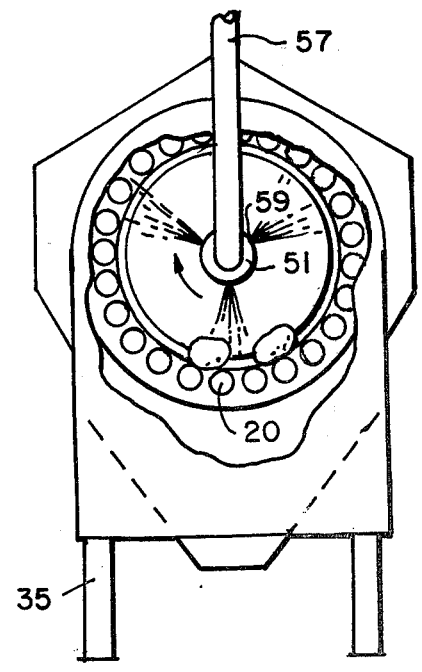
FIG. 4 is a cross-sectional view of the apparatus of FIG. 1 along the line 4—4.

To effect rotation of the drum 10, the ring 18 is provided on its perimeter with gear teeth 37 that are engaged by an endless sprocket chain 38 that passes around the ring and around a small sprocket 39 (FIGS. 1 and 3) which is rotatably driven by a motor 40. The drive connections are such that energization of the motor 40 causes rotation of the drum 10 in a clockwise direction when viewed from the entrance end 11 of the apparatus, as illustrated by the arrow 41 in FIG. 3. Preferably the rate of rotation of the drum can be changed by varying the speed at which the sprocket 39 is driven.

To effect an abrading action on the product passing through the drum 10, the individual rolls 20 are also power rotated. For this purpose, the end of every other roll 20 projects through and slightly beyond the mounting ring 18 at the entrance end of the apparatus and has fixed thereto a planetary gear 42 arranged to mesh with an internal ring gear 44. This ring gear is supported for rotation relative to the rotary drum 10 by rolls 45 mounted for free rotation on the projecting rolls 20 and engaging the interior of the integral shoulders 46 formed adjacent the teeth of the ring gear. The remaining rolls 20 project through the mounting ring 17 with a similar drive arrangement (not shown) so the adjacent rolls are turned in opposite directions.

The entire ring gear 44 is held against rotation by a bracket 47 fixed to the frame of the apparatus such that with rotation of the drum 10 in the clockwise direction the planetary gears 42 will be driven in an epicyclic motion around the interior of the internal ring gear 44 and be rotated individually in a counterclockwise direction. Preferably these rolls are turned at a rotative speed of 650 to 770 rpm while the drum 10 is turned at a speed of 22 rpm. Thus the drive arrangement of the drum 10 and of the individual rolls 20 is generally satisfactory for effecting an abrading action on the product 14 passing therethrough.

To move the product through the drum and assure uniform contact with the abrading rolls 20 there is also provided a rigid helicoid 50 supported on a shaft 51 extending through and coaxial with the drum 10. The helicoid has an outer peripheral diameter slightly less than the interior diameter of the rolls 20 so as to cause progression of the product through the drum 10. To drive the helicoid the shaft 51 is fixed to a sprocket 52 at the entrance end of the apparatus which in turn is powered by a chain 54 driven by a motor 55. The drive connections are such that the helicoid 50 is rotated in a counterclockwise direction when viewed from the entrance end of the apparatus serving not only to advance the product through the rotary drum but also to cause a rotation of the product to bring all surfaces thereof in contact with the rollers 20. In this manner an effective peeling operation is accomplished as the product is passed through the apparatus.

Thus as the product, such as potatoes, is passed through the apparatus after introduction into the entrance end 11, contact with the rolls 20 will cause abrasion of the peel for separation from the product body. Because of the rotation of the rolls 20 and the drum 10, the peel particles are thrown outward through the interstices 22 of the drum in a manner to strike either the interior of the frame 34 or the top cover 36. Thereafter the peel particles fall downward into a collecting through 56 which extends roughly over three-fourths of the length of the drum 10 forming a first compartment within the drum. These peel particles are in substantially dry form and therefore tend not to cling to the drum or rolls.

To cleanse the product of any remaining abraded peel material after the peeling operation, sprays of water are ejected from the shaft 51 adjacent the exit end 12 in a second compartment of the apparatus. For this purpose the water is introduced through the pipe 57 which connects with the projecting end of the shaft 51 and passes into the hollow shaft as far as a blocking partition 58. The water under pressure emerges from the nozzles or holes 59 spaced along the shaft to strike the product positioned near the exit end of the apparatus. In this manner the product is thoroughly cleaned as it is tumbled through the remaining portion of the drum 10 and emerges peeled and cleansed as it falls from the collecting trough 56. Any abraded peel material adhering to the product is washed off by the water and collected in the trough 60 positioned under this second compartment near the exit end of the apparatus. In this manner any remaining abraded material and water is kept separate from the dry abraded material which drops through the collecting trough 56. Thus a major portion of the abraded peel material exits the machine through the collecting trough 56 thereby making it reusable as dry material with a lesser portion being washed through the collecting trough 60 with the introduction of water.

The invention claimed:

1. Apparatus for continuously peeling fruits or vegetables comprising:
    a substantially horizontal rotary drum;
    means for supporting the rotary drum for rotation about its axis of rotation;
    a plurality of rolls having a diameter substantially less than that of the drum;
    means for mounting the rolls about the periphery of the drum so as to form the outer wall thereof with each roll being individually rotatable about its own axis and having an abrasive surface;
    means for rotating the drum and rolls individually such that fruits or vegetables introduced into one end of the drum will progress therethrough while coming into contact with the rolls for separation of the peel therefrom;
    a helicoidal conveyor mounted for rotation on a center shaft coaxial with the drum for effecting movement of the fruits and vegetables through the drum, said center shaft including a center opening therethrough;
    means for introducing water only into the drum portion near the exit end thereof including a water supply connecting with said center opening in said center shaft and openings through the shaft to the shaft exterior near the exit end of the drum;
    a trough beneath the portion of the drum into which water is introduced; and
    a second trough beneath the drum portions where water is not introduced.

2. Apparatus as defined in claim 1 including means for rotating said helicoidal conveyor and wherein the drum is rotated in one direction and the helicoidal conveyor is rotated in the opposite direction.

* * * * *